June 23, 1959 W. STEIN ET AL 2,891,455
TIMING MECHANISM FOR CAMERA FOCAL PLANE SHUTTER
Original Filed Aug. 28, 1951 4 Sheets-Sheet 1
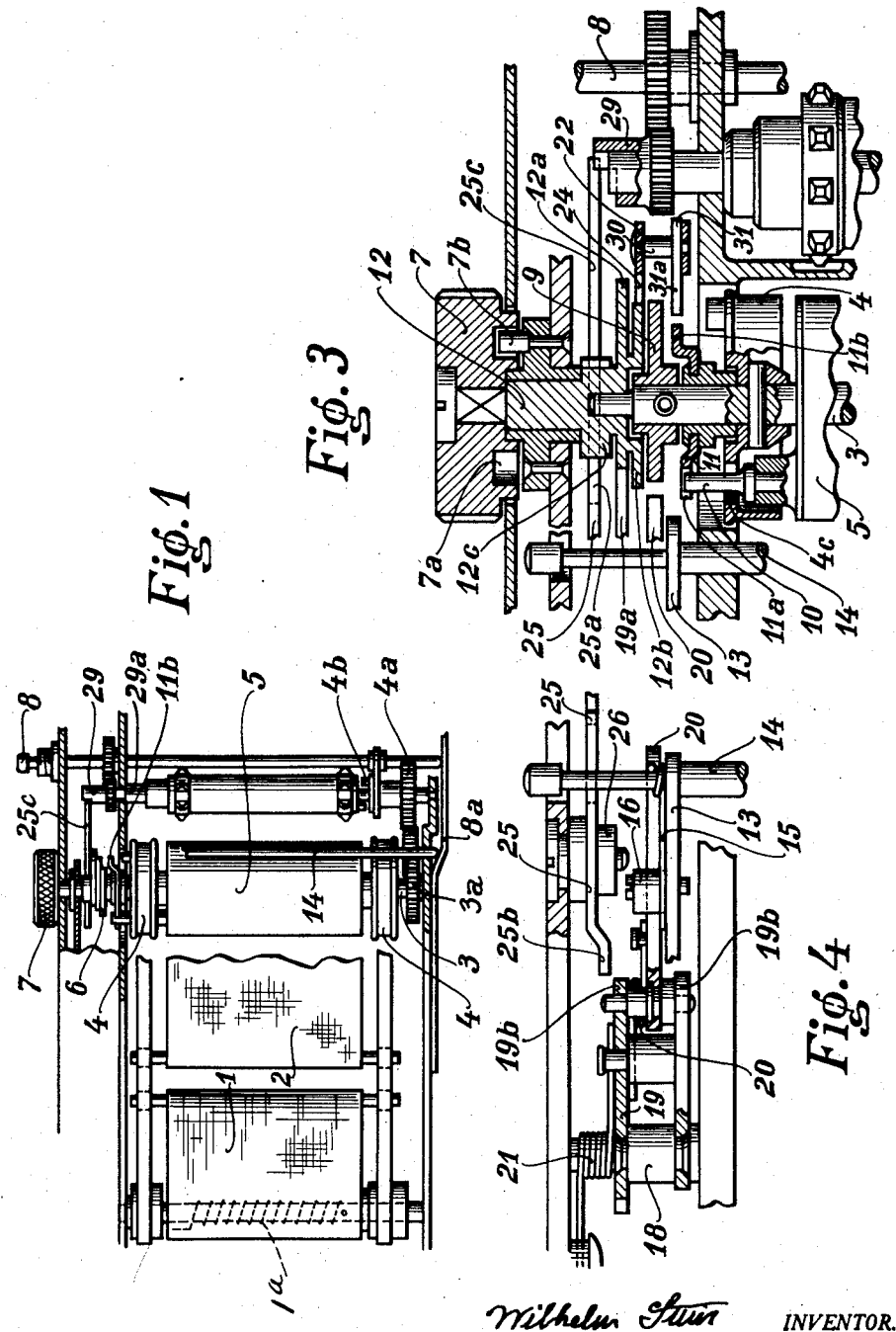

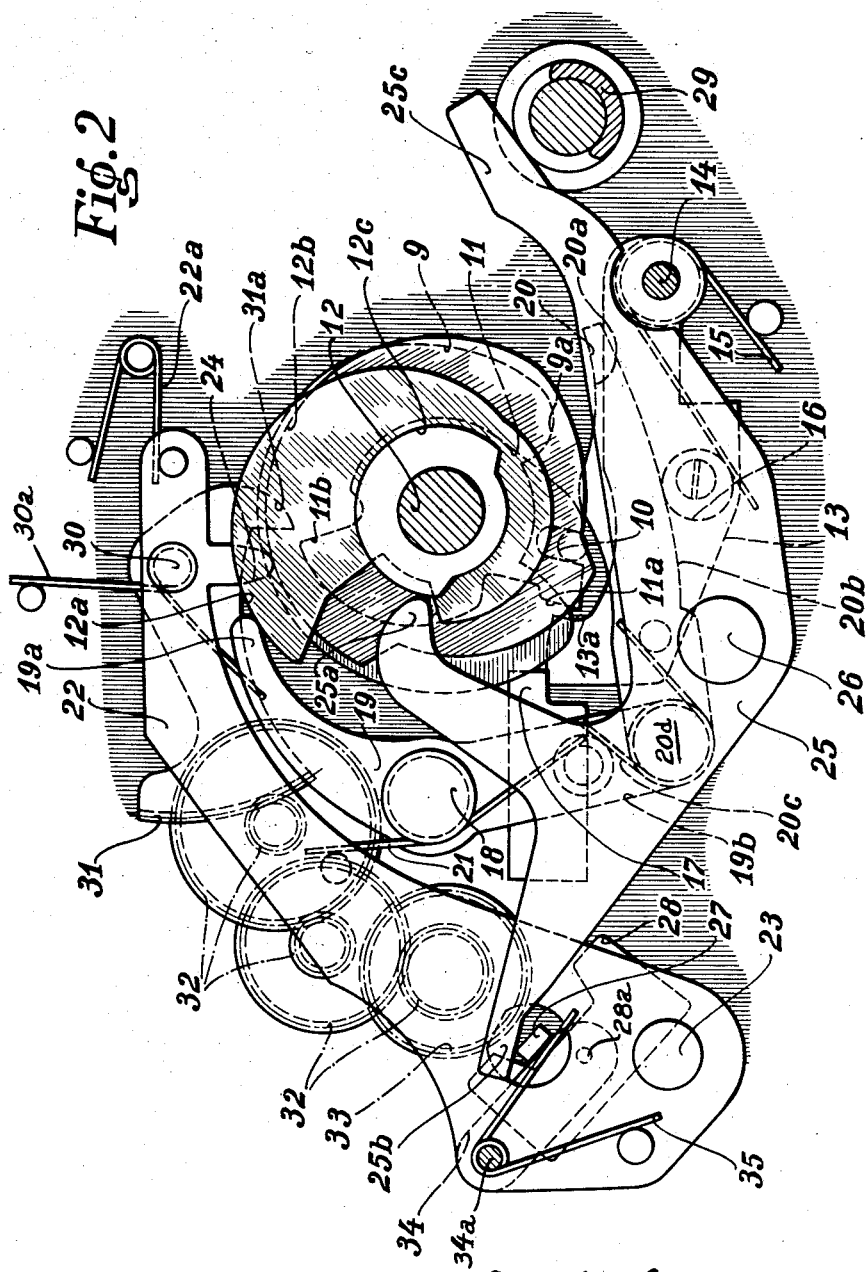

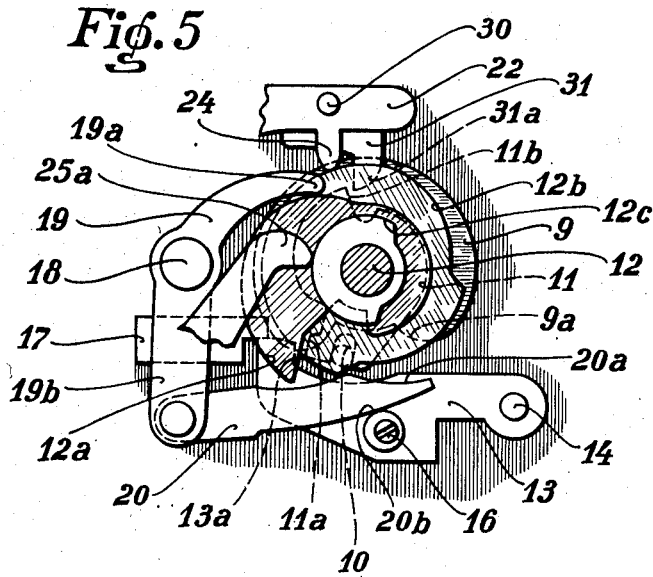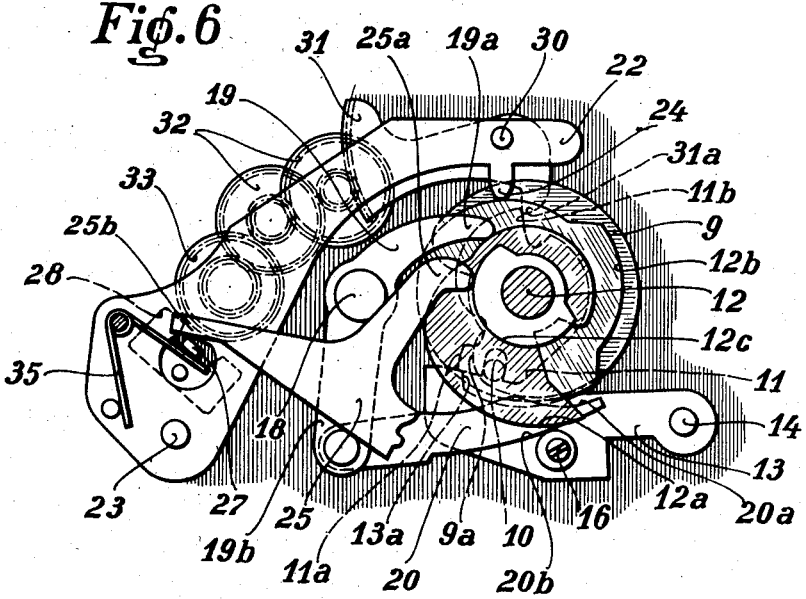

June 23, 1959 W. STEIN ET AL 2,891,455
TIMING MECHANISM FOR CAMERA FOCAL PLANE SHUTTER
Original Filed Aug. 28, 1951

INVENTORS

United States Patent Office 2,891,455
Patented June 23, 1959

2,891,455
TIMING MECHANISM FOR CAMERA FOCAL PLANE SHUTTER

Wilhelm Stein and Hugo Wehrenfennig, Wetzlar (Lahn), Germany

Continuation of application Serial No. 244,004, August 28, 1951. This application December 28, 1955, Serial No. 555,806

5 Claims. (Cl. 95—57)

This application is a continuation of our application Serial Number 244,004, filed August 28, 1951, and now abandoned, for improvements in timing mechanisms for camera focal plane shutters in which the shutter curtains are released, one after the other, without mechanical limitation of the size of the exposure opening or slit between the curtains. The first curtain is released by manual operation of the shutter or camera release. The release of the second curtain is controlled both by the movements of the first curtain and also by a cam mechanism which in turn is governed in its operations by the settings of the main speed dial knob or timing knob of the camera.

The invention disclosed in this application is an improvement upon and a development of the camera shutter mechanism disclosed in the U.S. Patent No. 2,122,671, dated July 5, 1938, in which the release of the second curtain is dependent upon the operations of many elements intervening between the release of the first curtain and that of the second curtain.

With such known timing mechanisms it is difficult to control the release movements when high speeds or short exposures are desired. It is also difficult to arrange the moments of the curtain releases for any desired exposure, particularly with respect to the provision of a timing mechanism which is adapted for connection with an exposure meter.

The object of this invention is therefore to provide a curtain shutter timing mechanism in which a certain improved cam mechanism is provided to insure a definite determination of the timing of the curtain releases by relatively long movements of the timing elements between the releases. Another object is to provide a timing mechanism in which the operation or setting of the timing knob will no longer necessarily be stepwise in accordance with the time markings on the camera, but exposures of any lengths may be obtained. Another object is to provide a timing mechanism wherein a single timing knob will suffice for adjusting the time controlling elements to operate for any desired exposure, including for example, exposures from one second to $\frac{1}{1000}$ of a second. Other features and objects of the invention will be best understood from the following specification and the accompanying drawings in which:

Fig. 1 is a detail view in elevation of the camera shutter mechanism with parts broken away and parts removed. The view is taken substantially in the direction of the arrow 1 in Fig. 2.

Fig. 2 is a top plan view of the timing mechanism embodying the invention showing the parts adjusted for a high speed or short exposure, parts being in section.

Fig. 3 is a sectional view through the timing knob and the improved cam mechanism with parts removed and parts broken away. Some elements of the mechanism are shown displaced for the sake of clearness.

Fig. 4 is a side view of the release and blocking members with parts in section and parts removed, the view being taken substantially on the line 4—4 of Fig. 2.

Fig. 5 is a plan view showing the mechanism adjusted for a short exposure different from the short exposure position shown in Fig. 2.

Fig. 6 is a similar view showing the parts adjusted for a longer exposure.

Figure 7:
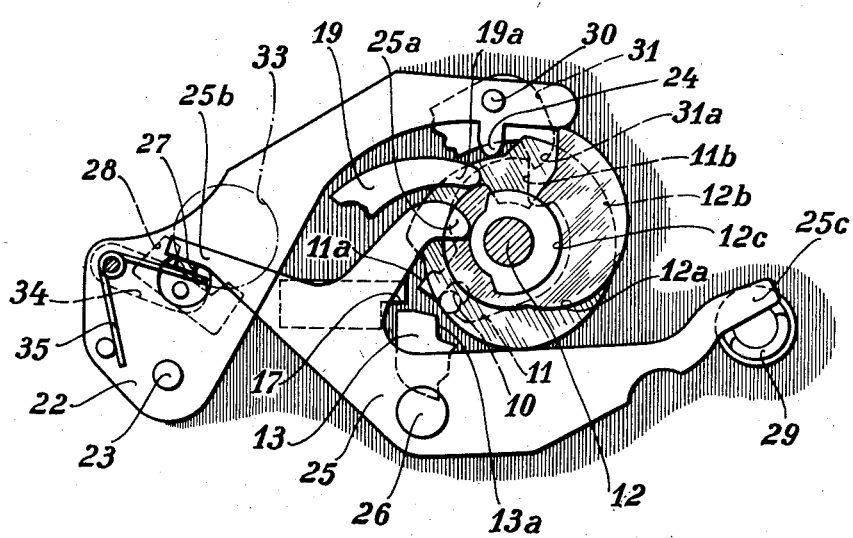
Fig. 7 shows the parts adjusted for a still longer exposure.

The timing mechanism disclosed herein is arranged for exposures governed by improved cam means, including certain brake means, which are set for the different exposures. Two differently adjusted positions of the parts for two examples of short exposures are shown in Figs. 2 and 5. For longer exposures the release of the second curtain is delayed by a certain escapement brake mechanism and the positions of the cams for such longer exposures are shown in Fig. 6 as an example. A still further delay in the release of the second curtain is obtained by setting the timing cams in such positions that not only the escapement brake means but also a braking anchor which otherwise is included in the brake means is operated to cause a longer delay in the release of the second curtain, and the corresponding positions of the cams are shown in Fig. 7.

Figure 8:
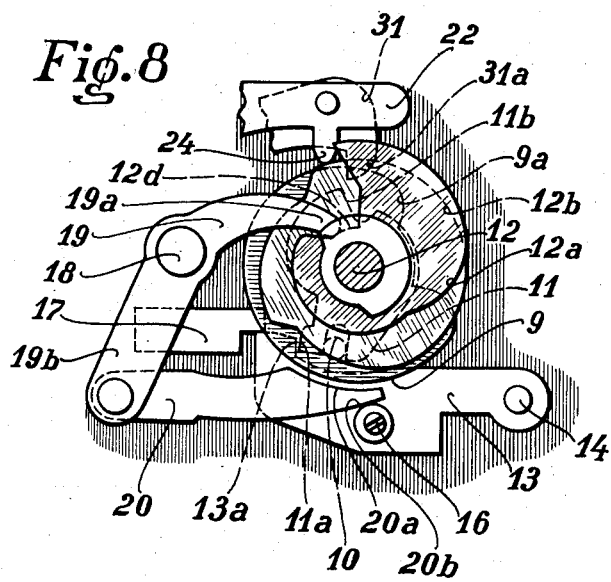
Fig. 8 shows the parts adjusted for time exposures.

In these settings of the timing mechanism the operator actuates the camera release manually only once and the correct time exposure is then controlled by the timing mechanism itself. Fig. 8 shows the positions of the timing cams for the so-called B-time exposures in which the shutter is held open by the operator for whatever time exposure he may desire.

Fig. 1 illustrates generally the known parts of a curtain shutter which includes the two curtains 1 and 2 which are carried on bands wound upon sheaves 4 mounted on a shaft 3. The curtains carrying drum 5 is coupled to the shaft 3. The timing mechanism is indicated at 6. The main speed dial or timing knob is marked 7. The shutter release is at 8. When the release is depressed by the operator the gear 4a is disengaged from the gear 3a on the shaft 3 and the clutch means at 4b are disengaged from the winding up mechanism which winds up the bands and film transporting springs. The first curtain is released by the depression of the release 8 and the curtain is then drawn across the camera by its transporting spring indicated at 1a, Fig. 1. After a desired time interval the second curtain is released and follows the first curtain a certain distance—exposure opening—therefrom.

Alongside the drum 5 there is supported an axially movable shaft 14, the top of which is broken away in Fig. 1. The shaft 14 rests upon the spring 8a. When the release 8 is depressed, the spring 8a is moved down and the shaft 14 also moves down. The first curtain then runs off to form the leading edge of the exposure opening between the curtains. The second curtain is prevented from moving until it is released by a separate release mechanism hereinafter described. Thereafter the two curtains move together across the camera with an exposure opening between them which depends upon the setting of the timing knob.

Referring now to Fig. 3 it will be seen that the band sheaves 4 are pinned to the shaft 3 which also has pinned thereto a release disk which is a part of the improved cam mechanism according to this invention. The release disk 9 has a release nose 9a. The drum 5 is freely rotatable on the shaft 3 and is coupled to a stop disk 11 by a pin 10 which projects upward through an opening 4c into an open slot in the disk 11. The latter is also freely rotatable on the shaft 3. The upper end of the shaft 3 is conveniently supported in a cam shaft 12 secured to the timing knob 7.

The stop disk 11 has two stop fingers 11a and 11b.

Fig. 2 shows the finger 11a below the shaft 12 and the other finger 11b above the shaft 12. The stop finger 11a is adapted to engage a stop tooth 13a on the free end of a stop lever 13 which is pivoted on the shaft 14 and moves vertically therewith. A spring 15 engages an eccentric knob 16 rotatably carried on the stop lever 13 and the spring acts to press the stop tooth 13a against a fixed stop 17 arranged in the camera.

Inasmuch as the stop disk 11 is coupled to the curtain drum 5 by the pin 10, Fig. 3, it follows that so long as the stop finger 11a on stop disk 11 engages the stop tooth 13a, the second curtain can not move. Not until the stop lever 13 is swung outward about the shaft 14 to disengage the stop tooth 13a from the stop finger 11a so as to leave the stop disk free to rotate about the shaft 3 is the second curtain drum 5 released for rotation. The stop lever 13 participates in the downward movement of the shaft 14 when the shutter is released so that the stop tooth 13a is moved down to engage the stop finger 11a to prevent immediate release of the second curtain.

The cam shaft 12, secured to the timing knob 7, carries three integral timing cams. The cam 12c is the uppermost cam, the cam 12a is the middle cam and the cam 12b is the lowermost cam. The three cams rotate with the timing knob 7, Fig. 3.

The first, uppermost, cam 12c controls the positions of a three-armed lever 25 pivoted at 26, Fig. 2. One arm 25a engages the cam. A second arm 25b controls the movement of a pivoted anchor 28, which is part of the escapement brake mechanism, by engaging with an anchor lug 27 projecting upwardly through an opening 27a in the pivoted escapement support 22. The third arm 25c moves within the range of a cam disk 29 on the upper end of a shaft 29 which is rotated by operation of the shutter winding up means, Fig. 1.

The second, middle, timing cam 12a controls the positioning of a two-armed lever 19 pivoted at 18, Fig. 2. One arm 19a of the lever engages the cam 12a under the pressure of a spring 21. The other arm 19b is a two-layer arm, Fig. 4, which supports a pivot 20d between the two layers of the lever arm. A releasing lever 20 is pivoted on the pivot 20d and controls the disengagement of the stop tooth 13a from the stop finger 11a in that said releasing lever 20 is kept in sliding contact with the said eccentric knob 16 on the stop lever 13 by a spring 20c acting upon the two layer arm of the lever 19.

The third, lowermost, timing cam 12b controls the position of the aforesaid escapement brake support 22 which is in the form of an arm pivoted at 23, Fig. 2, and extends alongside the cam mechanism. A spring 22a keeps a finger 24 at the support's free end in contact with the third lowermost timing cam 12b. The support at its free end also carries a pivot 30 for a swingable toothed segment 31 which has a hook nose 31a. A spring 30a keeps the segment in mesh with the escapement gearing unit 32 on the pivoted support 22 whereby to increase the running down resistance of the gears and whereby to move the gears 32 back into original position after the delayed release of the second curtain. The hook nose 31a is adapted to be moved into the path of movement of the second stop finger 11b of the stop disk 11, see Fig. 7.

The toothed segment 31 meshes with the gears 32 under pressure of the spring 30a as shown whereby to cause rotation of the anchor gear 33, Fig. 2, which is located opposite the aforesaid braking anchor 28. The anchor is pivoted at 28a on a swingable arm 34 pivoted at 34a on the escapement support 22. A spring 35 keeps the anchor lug 27 in engagement with the arm 25b of the three-armed lever 25. It follows therefor that the lowermost timing cam 12b controls the swinging movement of the escapement support 22 about the pivot 23.

When the shutter is rewound after an exposure, the stop disk 11 which is coupled to the second curtain via the upstanding pin 10 is rotated counterclockwise with the second curtain so that the stop finger 11a is brought in front of the stop tooth 13a to block immediate release of the second curtain.

The operations are as follows: As shown in Fig. 5, when the timing knob 7 is set for a short exposure, rotation of the knob and the cam shaft 12 positions all the cams in the cam mechanism whereby the lowermost cam 12b moves the braking member support 22 and the toothed segment 31 outward as shown and the segment hook nose 31a is no longer within the range of movement of the stop disk 11. The uppermost timing cam 12c is so positioned that its high point contacts the arm 25a of the three-armed lever 25, so that the second arm 25b will disengage the anchor 28 from the gear 33.

The reason for disengaging the anchor although the escapement support 22 as such is moved into inactive position by the cam 12b is to relieve the segment spring 22a from any extra pressure and in order to insure an unobstructed return to active position of the escapement support 22 and its associated parts for all exposures after the shutter has been released. The anchor 28 is thus operated in dependence upon the winding up mechanism of the shutter in that the arm 25c of the anchor lever 25 moves within the range of movement of the cam disk 29 carried by the toothed shaft 29a, Fig. 1, and whereby, when the shutter is rewound, the anchor is disengaged from the anchor gear 33.

The second, middle, timing cam 12a is so positioned that the two-armed lever 19 has been moved counterclockwise to cause a sliding movement of the release lever 20 along and, to the right, upon the eccentric knob 16 whereby said lever 20 has been spaced a definite distance from the nose 9a of the release disk 9 which is pinned to the shaft 3. The two-armed lever 19 moves the release lever 20 by means of the lever arms 19b and the pivot 20d, Fig. 4. It will be noted that at this time the entire escapement mechanism is inactive and that the positioning of the timing cam 12a determines, i.e. varies the position of the releasing lever 20 with relation to the nose 9a of the releasing disk 9.

When the shutter is released by depressing the release 8, the shaft 14 with the stop lever 13 thereon is moved down so that the stop tooth 13a is brought down lever with the stop disk 11, Fig. 3. The first curtain is now released and runs off. The second curtain does not move at this time because the stop tooth 13a of the stop lever 13 lies in the path of movement of the stop finger 11a of the stop disk 11 which is coupled with the curtain drum 5. Movement of the stop disk 11 and of the second curtain is therefore prevented. The pin 10 which couples the stop disk 11 to the curtain drum 5 is positioned by the winding up of the shutter.

However, the release disk 9 with the release nose 9a rotates with the first curtain and after the adjusted time interval, the nose 9a strikes the release curve 20a of the release lever 20. The latter is provided with another curved surface 20b which slides along and upon the eccentric knob 16 on the stop lever 13. The latter is therefore swung outward so that the stop tooth 13a becomes disengaged from the stop finger 11a. The blocking action of the two engaged members 13a and 11a no longer exists and the second curtain now runs off to follow the first curtain with an exposure opening between the curtains according to the setting of the timing knob 7. The second curtain is moved across the camera by a spring positioned parallel with the spring 1a. The time interval between the movements of the two curtains therefore depends upon the length of time it takes for the release nose 9a to reach and strike the release curve 20a. Until this happens, the second curtain can not move. When the shutter is rewound, the parts return to their initial positions. It should be noted that the power supplied to the release disk 9 and to the release nose 9a for striking the release lever 20 comes solely from the transporting spring 1a which moves the first curtain across the camera. Thus additional springs are not required for this purpose.

When the timing knob is set for longer, intermediate, exposures, the cams are positioned as shown in Fig. 6. The segment nose 31a is brought within the range of the stop finger 11b. The anchor remains disengaged from the anchor gear 33 because of the position of the three-armed lever 25 on the cam 12c. The middle cam 12a is so positioned that the released curve of the lever 20 is again spaced a definite distance from the release disk nose 9a.

Fig. 6 therefore illustrates the parts in the positions in which the exposure operation includes the participation of the escapement brake mechanism carried by the pivoted support 22 and whereby the release of the second curtain is delayed. In this figure it will be observed that the stop tooth 13a no longer engages the stop finger 11a and consequently there is no longer any blocking action existing between these two members. At the same time however, the other stop finger 11b has run against the hook nose 31a on the toothed segment 31. The stop disk 11 is operatively connected with the second curtain as shown at 5 and 10, Fig. 3. There is a spring for each curtain to draw it across the camera. The spring for the second curtain is not shown herein, but it is positioned parallel with the spring 1a described above. The positions and operations of the two springs and the two curtains are fully disclosed in the patent hereinbefore referred to.

The drawing power of the second curtain spring acts upon the hook nose 31a and tends to move it in a counterclockwise direction about the pivot 30. The spring 30a is therefore tensioned and the gears 32 and 33 are caused to rotate. The parts are so designed and proportioned that the turning moment of the toothed segment 31 causes a quick rotation of the gear 33. The frictional resistance of the movements of these parts together with the resistance of the spring 30a result in a relatively slow movement of the hook nose 31a until the stop finger 11b slides off the hook nose 31a and permits the release of the second curtain. The resistance of the rotating gears 32 and 33 serve to slow down the releasing movement of the second curtain.

In operation, the first curtain is run off as explained above and the breaking up of the blocking action of the two members 13a and 11a is likewise as aforesaid. After the disengagement of these two members, the stop disk 11 with the stop finger 11b will be held immovable by the hook nose 31a until the segment 31 under the influence of the spring, as at 1a, which transports the second curtain across the camera, and against the resistance of the running gears 32 as well as against the force of the segment spring 30a has been swung counterclockwise so far about its pivot 30 that the segment hook nose 31a has been disengaged from the stop finger 11b.

Now the second curtain runs off to form the rear edge of the exposure opening between the curtains, the width of the opening being determined by the adjusted distance between the release nose 9a and the release curve 20b on the lever 20 as well as by the depth of the contact between the hook nose 31a and the stop finger 11b. With the parts thus positioned the anchor 28 of the escapement mechanism is automatically disengaged from the operating parts of the timing mechanism. In this case, therefore, the time interval between the releases of the two curtains depends not only upon the spacing between 9a and 20a, but also upon the length of time it takes to disengage the segment hook nose 31a from the stop finger of 11b. Fig. 5 shows the parts in the positions for an exposure without participation of the escapement mechanism and before the release of the first curtain. Fig. 6 shows the parts in the positions when a longer exposure is desired and the second curtain is delayed in its release. This figure shows the positions of the parts just before the second curtain runs off.

Fig. 7 illustrates the positions of the parts when the timing knob is set for still longer exposures. In this case the uppermost cam 12c is so positioned that the arm 25a of the lever 25 is on the low part of the cam as shown, and no longer prevents the anchor 28 from engaging the gear 33 under the force of the spring 35. The segment hook nose 31a now engages the stop finger 11b.

The release of the shutter and the movements of the shutter curtains take place as explained above, but inasmuch as the anchor 28 delays rotation of the gears 32, the toothed segment hook nose 31a will remain longer in the path of the stop finger 11b until the segment has been swung so far about its pivot 30 that the nose 31a becomes disengaged from the stop finger and the release disk 11 therefore is free to rotate and the second curtain is released. Thus, the disengagement of the nose 31a from the stop finger 11b has been delayed and the exposure is longer.

Thus, by the setting of the timing knob and the timing cams as shown in Figs. 2, 5, 6 and 7, and in accordance with markings on the camera for short or shorter exposures, the exposures are made by depressing the release of the camera and the mechanism then functions automatically.

Fig. 8 shows the parts adjusted for time exposures. The middle cam 12a is now so positioned that the lever arm 19a rests upon the low cam portion 12d whereby the release lever 20 is moved entirely beyond the range of movement of the release cam disk nose 9a of the disk 9. The escapement brake mechanism is inactive as evidenced by the position of the brake finger nose 24 on the high part of the cam 12b.

When the shutter is released, the second curtain is prevented from moving because of the engagement of the blocking members 11a and 13a as shown. The second curtain moves to complete the exposure when the operator takes his finger off the shutter release 8 whereby the stop lever 13 with the stop tooth 13a, moving upwardly with the shaft 14, is elevated by the spring 8a and thereby raised above the level of the stop disk 11, Fig. 1. When the shutter is rewound, the cam 29 on the shaft 29a, Fig. 2, engages the arm 25c of the lever 25 so as to move the other arm 25b to cause the anchor to be disengaged from the gear 33 whereby to insure that the gears 32 and the segment 31 easily and quickly return to starting positions. It also prevents wear on the gears and eliminates noise.

The movements of the release lever 20 is tangential with respect to the rotating movement of the release cam nose 9a on the release disk 9, thereby providing for a relative large movement of the parts between short exposures or for short exposures. The formation of the release lever 20 with the curve 20a for contact with the release disk 9 together with the sliding curved surface 20b, Figs. 5 and 8, which engages the eccentric knob 16 makes it possible to mark the timing knob or the camera with any desired time intervals.

The disclosed arrangement also makes it possible to attach an exposure meter, not shown, directly to the timing knob having in mind the characteristic features of such a meter. The use of curved cams regulating the positions of the time controlling elements enables the operator to set the timing mechanism for selected exposures without the necessity of setting the timing knob with relation to a definite exposure scale. The timing knob 7, Fig. 3, is provided with a circular groove 7a which moves over a fixed stop 7b whereby to limit the rotary movement of the knob. This is a practical advantage when the knob is connected with an exposure meter.

The knob 16 is eccentrically mounted upon the stop lever 13 so that the movement of the release lever 20 along and against the knob will cause automatic adjustment of the lever 20 with relation to the release disk nose 9a. The weight of the two moving bodies of the two levers 20 and 13 will have a restraining effect upon the movement of the release disk 9 and therefore also upon the movement of the first curtain so that the speed thereof will be more evenly proportional with relation to the speed of the second curtain.

When the release 8 is depressed, the shaft 3 is free to rotate so that the first curtain can run off across the camera by the usual curtain transporting spring, Fig. 1. The second curtain can not then run off because the stop lever 13 has been moved down to prevent rotation of the stop disk 11 which is coupled to the curtain drum 5. In Fig. 8 the lever 13 prevents rotation of the stop disk 11 (run off of the second curtain) until the operator releases his pressure upon the release 8 after the time exposure. In Fig. 7 the braking action of the anchor is brought into play so that a delay occurs before the release cam nose 9a can reach and engage the release curve 20a on the lever 20. In Fig. 6 the additionally delaying action of the anchor is removed and a shorter exposure provided for. In Fig. 5 the operation of the timing mechanism provides for short exposures in that the lapse of time between the run offs of the two curtains is equal only to the time it takes for the cam nose 9a to reach the curve 20b, all other interfering factors being inactive.

The invention herein disclosed is superior in operation in that it provides a direct action releasing blow by the releasing cam nose 9a upon the releasing lever 20, the releasing power or force being supplied directly by the first curtain transporting spring without any intervening elements, and without any variation in the force or tension of the actuating spring. The releasing lever 20 never contacts the releasing disk 9 until struck by the releasing nose 9a. The releasing lever need not therefore have any particular formation except that its curved form and its sliding contact with the eccentric knob 16 provides means for an infinite fine adjustment.

The operation of the mechanism is of course wholly automatic in response to the setting of the timing knob and timing means carried by the knob. The several cams, levers and associated parts are conveniently mounted below the knob 7 and generally indicated by the reference numeral 6. The invention herein disclosed is not necessarily limited to the precise details of construction described and illustrated and we claim all such changes and modifications as come within the principle of the invention and the scope of the appended claims.

We claim:

1. A camera shutter mechanism comprising a first and a second normally closed shutter curtain successively released to provide an exposure opening between them, a timing mechanism controlling the time interval between successive releases of said curtains comprising a shaft rotatable with the release of the first curtain, a release disk pinned on said shaft to rotate therewith, a stop disk freely rotatable about said shaft and operatively connected with the second curtain, a vertically movable and swingably supported stop lever normally disengaged from said stop disk, means for moving said stop lever to engage said stop disk to prevent rotative movement thereof and release of the second curtain simultaneous with the release of the first curtain, a release lever, a two-armed lever pivotally supporting said release lever and provided with a first cam nose, means on said stop lever operatively engaging the release lever to maintain the latter in the path of rotation of said release disk to be engaged thereby, a middle timing cam engaged by said first cam nose, a gear unit adapted to delay release of the second curtain, a pivoted arm supporting said gear unit and provided with a second cam nose, a gear unit cam engaged by said second cam nose, a timing shaft integral with the said two cams, a knob integral with said timing shaft for rotating the latter and the said two cams to move the said gear unit supporting arm and gear unit into an inactive position in said timing mechanism and to move said release lever in slidable engagement with said maintaining means into a predetermined spaced relation to said releasing disk to be engaged by the latter, as said disk is rotated upon release of the first curtain, to cause disengagement of said stop lever from said stop disk whereby to release the second curtain, said gear unit for delaying release of the second curtain including a toothed segment lever pivoted on said unit supporting arm, said freely rotating stop disk having a stop finger projecting therefrom, said segment lever having a stop nose automatically positioned in the path of rotation of said stop disk finger when said gear unit cam nose is placed in delayed exposure position by rotation of said timing shaft and gear unit cam, a spring engaging said toothed segment lever to move the same to increase the running down resistance of the gearing and to restore said toothed segment to original position after the delayed start of the second curtain, a second spring for keeping the said stop nose in the path of rotation of said stop disk finger and spring means connected with the second curtain for transporting the same for moving said segment nose out of the path of rotation of said stop disk finger whereby to release the second curtain.

2. A timing mechanism as claimed in claim 1 including means for increasing the motion resistance in said gear unit comprising an anchor pivoted on said unit supporting arm, a spring on said arm urging said anchor into engagement with the gears in the unit to increase the motion resistance therein, a pivotally supporting anchor lever engaging said anchor to normally disengage the anchor from the unit, an anchor cam integral with said gear unit cam and with said timing shaft, an anchor nose on said anchor lever engaging said anchor cam whereby when said timing shaft and anchor are adjusted for an exposure requiring inclusive operation of said gear unit, said anchor lever is disengaged from the anchor.

3. A timing mechanism as claimed in claim 1 including a rotatable shutter winding up shaft, means for rotating said shaft, an extension integral with said pivotally supported anchor lever, a cam on said winding up shaft engaged by said extension for moving the anchor lever to disengage the said anchor from the gear unit when the said curtain shutter is being wound up.

4. A camera shutter mechanism comprising a first and a second normally closed shutter curtain successively released to provide an exposure opening between them, a timing mechanism controlling the time interval between successive releases of said curtains comprising a shaft rotatable with the release of the first curtain, a release disk pinned to said shaft to rotate therewith, a stop disk freely rotatable about said shaft and operatively connected with the second curtain, a vertically movable and swingably supported stop lever normally disengaged from said stop disk, a vertically movable rod connected to said lever for moving the same into engagement with said stop disk to prevent release of the second curtain simultaneous with release of the first curtain, a release lever adapted to be struck by said release disk as the latter rotates with the said shaft for disengaging said stop lever from the stop disk to release the second curtain, an eccentric rotatable button on said stop lever engaging said release lever for supporting the same in the path of rotation of said release disk, a two-armed lever pivotally connected to said release lever for positioning the same in spaced relation to the release disk corresponding to the length of exposure desired, a middle timing cam, a first cam nose on said two-armed lever engaging said middle timing cam, an exposure prolonging gear unit, a pivoted arm supporting said unit, a gear unit cam, a second cam nose on said pivoted arm, a spring for urging said second cam nose into engagement with said gear unit cam, a toothed segment lever pivoted in the free end of the said pivoted arm, a stop finger on said rotatable stop disk, a hook stop nose on said segment lever, a second spring for keeping said segment lever in operative engagement with said gear unit, said second cam nose contacting said gear unit cam for positioning said segment hook nose in the path of rotation of said stop disk finger to delay the release of the second curtain, an anchor pivotally supported on said pivoted arm, an anchor spring normally keeping the anchor in operative engagement with said gear unit to increase the motion resistance therein, a curtain wind up device, a cam thereon, a three-armed lever for simultaneously engaging said anchor and said wind up device cam to disengage the anchor from the gear unit when the shutter is being wound up, an anchor cam, a third cam nose on said three-armed lever engaging said anchor cam for operation of said three-armed lever, a timing shaft for integrally supporting the said three timing cams thereon in superposed relation axially above the said shaft, a knob on said timing shaft for rotating the latter together with the said three cams to move the two-armed lever, the said three-armed lever and the said pivoted arm and the mechanisms actuated by the said cams, respectively, to provide desired time intervals between releases of the two shutter curtains with or without participation of the said delaying means, the anchor, the toothed segment or the gear unit, respectively, springs for keeping the said cam noses in contact with their said respective cams, said releasing disk, upon release of the first curtain, rotating with the said shaft to strike the releasing lever to release the second curtain, said releasing lever being moved tangentially with respect to said timing shaft and in sliding contact with the said eccentric button.

5. A timing mechanism for a camera focal plane shutter in which a first and a second curtain are successively released and moved to form an exposure opening between them on their travel across the objective field comprising means to release the first curtain, a rotatable second curtain release disk operatively connected with the first curtain, a stop disk operatively connected with the second curtain, a spring actuated stop lever engaging said stop disk for said second curtain to prevent release of the second curtain when the first curtain is released, said stop lever bearing an eccentric knob, a timing cam operatively connected with the time setting knob of the camera, a slidably and swingably supported second curtain release member having two opposite curved sides, one of which sides serves as a stroke side to receive the impact of said releasing second curtain releasing disk when the latter is rotated upon release of the first curtain, the other of the said two opposite sides being longitudinally movable in constant contact with the said eccentric knob to vary the distance between the said stroke side and the said releasing disk, thereby determining the time point at which said release disk strikes the said second curtain release member to move said stop lever out of engagement with said stop disk to release the second curtain, a pivoted lever contacting said timing cam and pivotally connected with said second curtain releasing member to operate the latter and a time setting knob for operating the said timing mechanism.

References Cited in the file of this patent
UNITED STATES PATENTS
2,122,671  Leitz et al. _____ July 5, 1938